United States Patent [19]

Caron

[11] Patent Number: 5,307,667
[45] Date of Patent: May 3, 1994

[54] RESPONSE TIME TEST APPARATUS FOR A MASS AIR FLOW SENSOR

[75] Inventor: Richard W. Caron, Canton, Mich.

[73] Assignee: Ford Motor Company, Dearborn, Mich.

[21] Appl. No.: 913,127

[22] Filed: Jul. 13, 1992

[51] Int. Cl.$^5$ .......................................... G01F 25/00
[52] U.S. Cl. ................................................ 73/3
[58] Field of Search ................................... 73/3

[56] References Cited

U.S. PATENT DOCUMENTS

| | | | |
|---|---|---|---|
| 2,755,663 | 7/1956 | Smith et al. | 73/3 X |
| 3,469,442 | 9/1969 | Brueckner | 73/3 X |
| 3,578,755 | 5/1971 | Bynum et al. | 73/1 H |
| 3,604,254 | 9/1971 | Sabuda | 73/3 X |
| 3,741,009 | 6/1973 | Bordeaux | 73/3 X |
| 3,750,472 | 8/1973 | Ducousset | 73/3 X |
| 4,590,790 | 5/1986 | Hicks et al. | 73/3 |
| 4,753,095 | 6/1988 | Jones, Jr. et al. | 73/3 X |
| 4,823,591 | 4/1989 | Lewis | 73/3 |
| 5,072,416 | 12/1991 | Francisco, Jr. et al. | 73/3 X |
| 5,132,917 | 7/1992 | Bass | 73/861.04 X |
| 5,238,030 | 8/1993 | Miller et al. | 141/4 |

*Primary Examiner*—Tom Noland
*Attorney, Agent, or Firm*—Roger L. May; Peter Abolins

[57] ABSTRACT

A response time test apparatus for a mass air flow sensor (10) mounted on a sensor manifold (12) connectable to the air intake manifold of an internal combustion engine. The test apparatus has a connector member (28) to which the sensor manifold (12) may be attached and a primary manifold (30) connected between a vacuum source (46,48) and the connector member (30). The primary manifold (30) has a first branch (32) and a parallel second branch (38). The first branch (32) has a first sonic nozzle (34) and a first valve (38) controlling the air flow through the first branch (32). The second branch (38) has a second sonic nozzle (40) and a second valve (42) controlling the air flow through the second branch (32). The first and second sonic nozzles (34,40) producing substantially different air flow rates in the primary manifold (30). An electrical control (50) sequentially activates the first and second valves (38,42) to produce a step change in the air flow rate through the sensor manifold (12), records the output signals of the mass air flow sensor (10) and determines the response time of the mass air flow sensor (10) in response to the step change in the air flow rate. The electrical control (50) also is capable of comparing the response time with a reference time to detect each mass air flow sensor (10) having a response time greater than a specified response time.

19 Claims, 1 Drawing Sheet

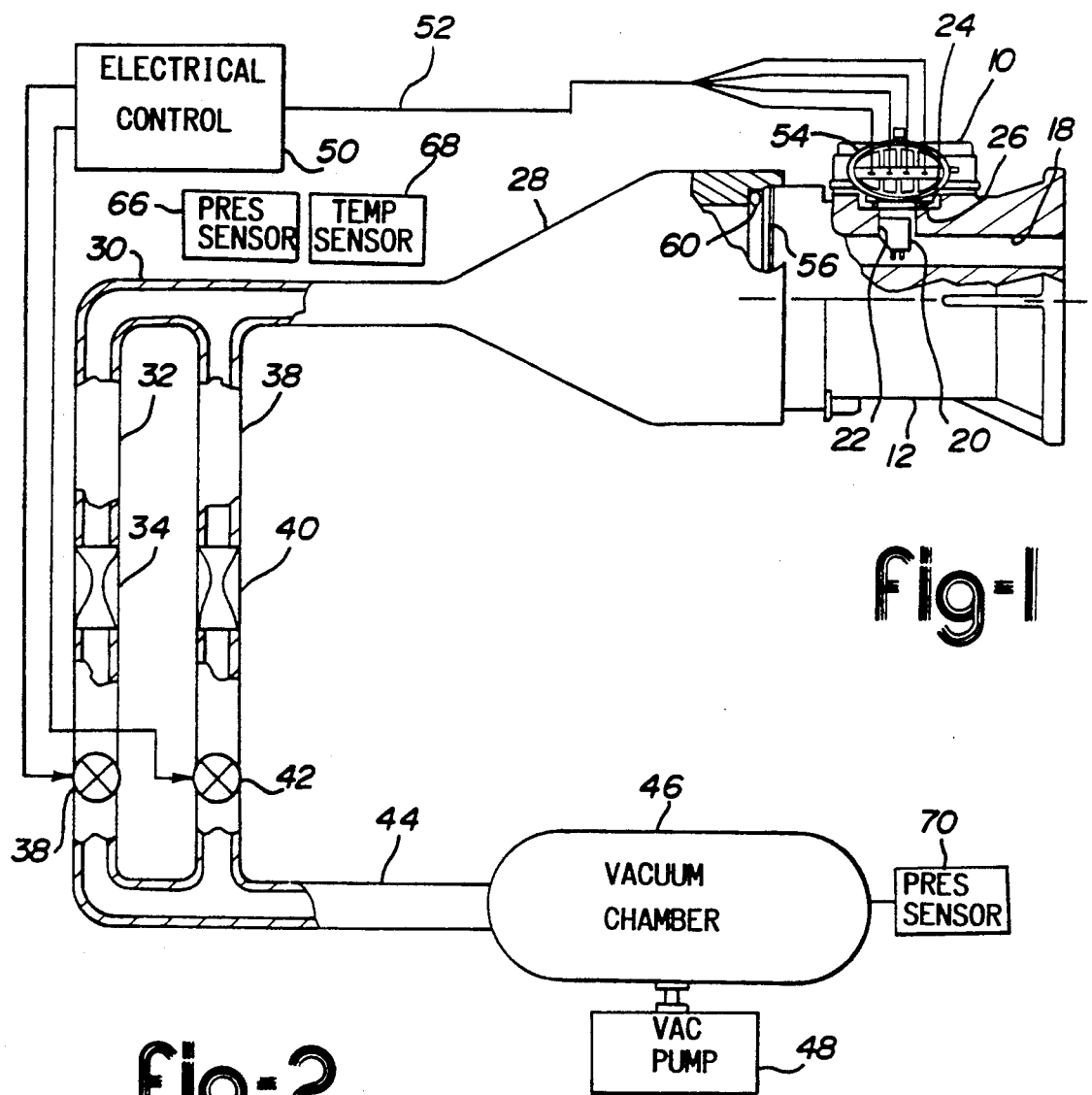
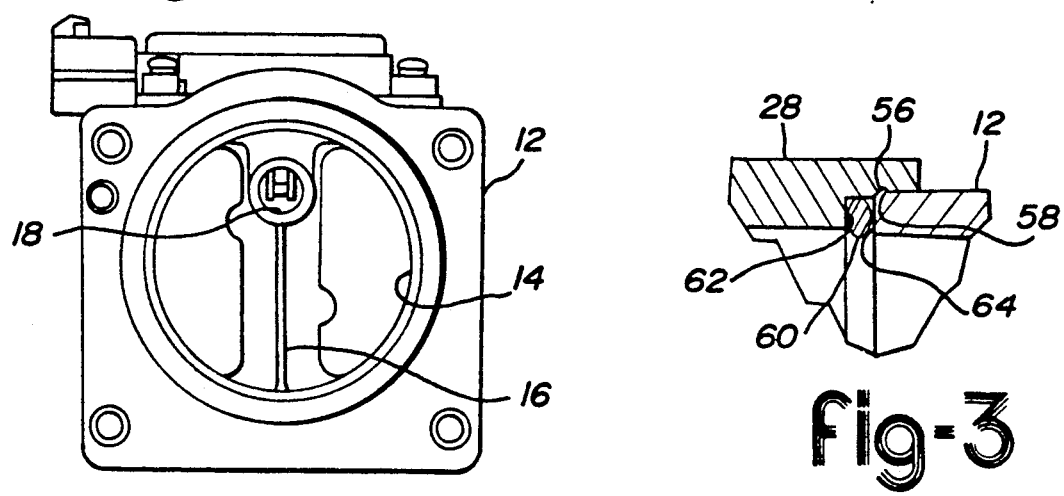

RESPONSE TIME TEST APPARATUS FOR A MASS AIR FLOW SENSOR

TECHNICAL FIELD

The invention is related to mass air flow sensors and in particular to a response test apparatus for measuring the response time of a mass air flow sensor mounted on a sensor manifold.

BACKGROUND ART

With the advent of electronic fuel control systems for internal combustion engines, a sensor for detecting the quantity of air being inhaled by the engine is required. This information is required by the electronic fuel control system to accurately control the quantity of fuel to be delivered to the engine. Mass air flow sensors have been developed to directly measure the mass air flow rate of the air through the engine's air flow. The mass air flow sensor must not only accurately measure the mass air flow rate through the engine's air intake manifold, but also must be able to quickly respond to rapid or step changes in the engine's air intake manifold in order to assure a proper quantity of fuel is being delivered to the engine. If the response time of the mass air flow sensor is too long, too much, or too little, fuel may be provided to the engine.

During rapid acceleration of an automotive vehicle, the operator will rapidly open the engine's throttle causing a step change in the mass air flow rate through the air intake manifold. As is known in the art, an acceleration enrichment portion of the electronic fuel control system will momentarily increase the quantity of fuel being delivered to the engine. This increase automatically compensates for time lag between the step increase in the quantity of air being delivered and quantity of fuel being delivered under the control of the electronic fuel control system.

Since the quantity of air being delivered to the engine is one of the primary factors used in the computation of the quantity of fuel to be delivered, it is imperative that the response time of the mass air flow sensor be sufficiently short so as not to significantly contribute to the lag between the step increase of the quantity of air being delivered to the engine and the delivery of a corresponding increased quantity of fuel.

As part of the normal production quality control process, the response time of the mass air flow sensor is tested to determine if it is within specification limits.

The invention is an automated response time apparatus which is fast, accurate and highly repeatable.

SUMMARY OF THE INVENTION

The invention is an automated response time test apparatus for a mass air flow sensor in which the air flow to the mass air flow sensor is subjected to a step change and the response time is accurately measured by an electrical control.

The advantage of the response time test apparatus is that the mass air flow prior to and after the step change is accurately controlled by sonic nozzles operating under sonic flow conditions.

In the automated response time test apparatus, the mass air flow sensor is mounted on a sensor manifold connectable to the air intake manifold of an internal combustion engine. The response time test apparatus has a connector member adapted to sealingly receive the sensor manifold. A primary manifold is connected between the connector member and a vacuum source. The primary manifold has a first branch having a first sonic nozzle. The first sonic nozzle providing a first mass air flow rate in the primary manifold. The first branch also has a valve controlling the air flow through the first branch. The primary manifold also has a second branch in parallel with the first branch. The second branch has a second sonic nozzle providing a second mass air flow rate through the primary manifold and a second valve controlling the air flow through the second sonic nozzle and the second branch. The second mass air flow rate being substantially greater than the first mass air flow.

An electrical control has means for sequentially actuating the first and second valves to produce a step change in the mass air flow rate through the primary manifold and the sensor manifold. The electrical control has means for energizing the mass air flow sensor to generate a mass air flow signal corresponding to the mass air flow through the sensor manifold, means for recording the mass air flow signals, means for computing the response time of the mass air flow sensor and means for comparing the response time with a reference response time to generate a fail signal when the response time is longer than the reference response time.

The details and further advantages of the response time test apparatus will become more apparent from a reading of the specification in conjunction with the drawings.

BRIEF DESCRIPTION OF THE DRAWINGS

FIG. 1 is a system diagram showing the details of the response time test apparatus.

FIG. 2 is a front view of the sensor manifold.

FIG. 3 is a partial cross section of the sensor manifold and the connector showing the details of the connection elements.

BEST MODE FOR CARRYING OUT THE INVENTION

The details of the response time test apparatus are shown in FIG. 1. For this test, the mass air flow sensor 10 is mounted on a sensor manifold 12 which is attachable to the air intake manifold of an internal combustion engine. The sensor manifold 12 has a main air passageway 12 divided by a diametrically disposed rib 16, and a sensor air flow passage 18. The mass air flow sensor 10 has a sensing head 20 which extends into the sensor air flow passage 18 through a port 22. An O-ring 24 forms a seal between the mass air flow sensor 10 and the bottom of a well 26 provided in the sensor manifold 12 effectively sealing the port 22.

The sensor manifold 12 is mounted to a connector 28 which connects the main and the sensor air flow passages 14 and 18 of the sensor manifold to a primary manifold 30. The primary manifold 30 has a pair of parallel branches. The first parallel branch 32 has a first sonic nozzle 34 and valve 36 switchable from a closed to an open position in response to signals received from an electrical control 50. The second parallel branch 38 has a second sonic nozzle 40 and a valve 42. Like the valve 36, the valve 42 is switchable from a closed to an open position in response to signals received from the electrical control 50.

The first and second branches 32 and 38, respectively, are connected to a vacuum source such as vacuum chamber 46 through a connector manifold 44. Alternately, the first and second branches 32 and 38 of the primary manifold may be individually connected to the vacuum chamber 46. A vacuum pump 48 maintains the pressure in the vacuum chamber 46 below a specified pressure.

The valves 36 and 42 may be solenoid valves activated directly by the signals received from the electrical control 50 or may be pneumatic valves controlled indirectly through intermediate solenoid valves as is known in the art.

The mass air flow rates through the sonic nozzles 34 and 40 are significantly different. In the preferred embodiment, the mass air flow rate through sonic nozzle 34 is in the range from 180 kilograms/hour to 250 kilograms/hour and preferably has a value of 210 kilograms/hour. The mass air flow rate through sonic nozzle 40 is in the range from 2 kilograms/hour to 15 kilograms/hour and preferably has a value of about 10 kilograms/hour.

An electrical cable 52 connects the electrical control 50 to the mass air flow sensor 10. The electrical cable 52 has a female electrical connector (not shown) which is received in the male connector 54 of the mass air flow sensor 10. The electrical control 50 has means for energizing the mass air flow sensor, means for recording the output signals generated by the mass air flow sensor means for determining the response time of the mass air flow sensor to a step change in the mass air flow rate through the sensor manifold and comparator means for comparing the response time of the mass air flow sensor with a reference value to determine if the response time is within specifications.

The mass air flow sensor manifold 12 is attached to the connector 20 by the snap action latching of a triangularly shaped external head provided at the end of the sensor manifold 12 into a V-shaped annular groove 58 provided in the internal surface of the connector 28. The connector 28 may be made from a semi-rigid structural plastic having sufficient resiliency to hold the triangularly shaped head of the sensor manifold in the V-shaped groove of the connector 28. FIG. 3 is an enlarged cross-sectional view showing the details of the relationship between the triangular head 56 and the annular V-shaped groove 58. When the triangular head 56 is locked into the V-shaped groove, an O-ring 60 is compressed between a shoulder 62 provided in the connector 28 and the end 64 of the sensor manifold 12 and provides a pneumatic seal between the connector 28 and the sensor manifold 12.

In operation, the sensor manifold 12 having a mass air flow sensor 10 is attached to the connector 28 and the cable 52 is connected to the electrical connector 54 and the mass air flow sensor is energized. Valve 42 is opened and sonic nozzle 40 provides a first mass air flow rate through the sensor manifold and the electrical control 50 records the value of the output signal being generated by the mass air flow sensor. After a short period of time, valve 36 is opened and sonic nozzle 34 produces a second mass air flow rate through the sensor manifold and the electrical control records the time it takes for the output signal of the mass air flow sensor to rise to a new stabilized value and determines the response time of the mass air flow sensor. The response time test may also include closing valve 36 and measuring the time required for the output signal of the mass air flow sensor 10 to return to its original value. The electrical control will also compare the determined response time with a reference value which is normally the maximum allowable response time and will generate a fail signal if the measured response time is greater than the reference value.

If a step response time starting from a null mass air flow rate (0 kilogram/hour) is desired, the test can be conducted by only opening valve 36 giving a step change in the air flow rate from 0 to a flow rate in the range from 180 to 240 kilograms/hour.

As is known in the art, the mass air flow rate through a sonic nozzle when operating at a critical sonic flow condition is very stable and repeatable. The sonic nozzles also achieve a critical sonic flow condition almost instantaneously when the associated valve is opened. Once the air flow through the sonic nozzle reaches a sonic condition, the mass air flow through the sonic nozzle remains a constant. Typically under a constant pressure and temperature, the sonic nozzle will control the air flow through the sensor manifold within plus or minus 1.0 percent of the desired mass air flow.

The inclusion of a pressure sensor 66 and temperature sensor 68 upstream of the sonic nozzles 34 and 40 and a pressure sensor 70 monitoring the pressure in the vacuum chamber 46 is shown in FIG. 1. By accurately measuring the pressure and temperature of the air upstream of the sonic nozzles 34 and 40, electrical control 50 can accurately compute the actual mass air flow through the sensor manifold to a theoretical accuracy of 0.4 percent. The measurement of the pressure in the vacuum chamber 46 is used to confirm that the sonic nozzles 34 and 40 are operating under sonic conditions.

Having described the preferred embodiment of the response time test apparatus with reference to the specific structure shown in the appended figures, it is recognized that those skilled in the art may make changes and improvements thereto within the scope of the appended claims.

I claim:

1. A response time test apparatus for a mass air flow sensor mounted on a sensor manifold comprising:
   a connector member having a first end connectable to said sensor manifold and a second end;
   a vacuum chamber;
   a primary manifold connected between said second end of said connector and said vacuum chamber, said primary manifold having a first branch and a second branch;
   a first sonic nozzle having a firs air flow rate under sonic air flow conditions disposed in said first branch;
   a first valve disposed in said first branch, said first valve having an open state allowing air to flow through said first sonic nozzle and a closed state preventing air flow through said first sonic nozzle;
   a second sonic nozzle having a second air flow rate under sonic air flow conditions disposed in said second branch;
   a second valve disposed in said second branch, said second valve having an open state allowing air to flow through said second sonic nozzle and a closed state preventing said air flow through said second sonic nozzle;
   an electrical control connected to said first and second valves and said mass air flow sensor, said electrical control having means for activating said first and second valves to produce a step change in the mass air flow rate through said primary manifold and said sensor manifold from said first air flow rate to said second air flow rate, means for energizing said mass air flow sensor to generate a mass air flow signal having a value corresponding to the mass air flow rate of the air passing through said sensor manifold and means for recording a time required for said mass air flow signal to change from a first value to a second value in response to said step change in said mass air flow rate.

2. The test apparatus of claim 1 wherein said first mass air flow rate controlled by said first sonic nozzle is substantially greater than said second mass air flow rate controlled by said second sonic nozzle.

3. The test apparatus of claim 2 wherein said first mass air flow rate is between 180 and 240 kilograms per hour and wherein said second mass air flow rate is between 2 and 15 kilograms per hour.

4. The test apparatus of claim 2 wherein said first mass air flow rate is approximately 210 kilograms per hour and said second mass air flow rate is approximately 10 kilograms per hour.

5. The test apparatus of claim 2 wherein said electrical control first activates said second valve to produce said second mass air flow rate through said sensor manifold and then activates said first valve to produce said step change in the mass air flow rate through said sensor manifold and wherein said control further includes means responsive to said time required for said output signal of said mass air flow sensor to change from said first value to said second value to generate a response time signal having a value corresponding to said time.

6. The test apparatus of claim 5 wherein said electric control has means for comparing the value of said response time signal to a reference value to generate a fail signal when the value of said response time signal is different from said reference value by a selected amount.

7. The test apparatus of claim 5 wherein said electrical control has logic means for comparing the value of said response time signal to a maximum value and logic means for generating a fail signal when the value of said response time signal is greater than said maximum value.

8. The test apparatus of claim 1 wherein said sensor manifold has an annular rib provided adjacent to its air outlet end, and wherein said connector has an internal groove into which said annular rib is received with a snap action.

9. The test apparatus of claim 8 further comprising an O-ring compressively received between said connector member and said sensor manifold to form a pneumatic seal therebetween when said annular rib is received in said annular groove.

10. The test apparatus of claim 1 further comprising at least a first pressure sensor disposed between said first and second sonic nozzles and said connector member to generate a pressure signal indicative of the pressure in said primary manifold upstream of said first and second sonic nozzles and a temperature sensor for generating a temperature signal corresponding to the temperature of the air in said primary manifold upstream of said first and second sonic nozzles, and wherein said electrical control has means responsive to said pressure signal and said temperature signal to accurately determine the mass air flow rate through said sensor manifold.

11. A response time test apparatus for a mass air flow sensor mounted on a sensor manifold comprising attachable to the air intake manifold of an internal combustion engine, said sensor manifold having an air inlet end and an air outlet end, said test apparatus comprising:

a connector member having a first end connectable to said air outlet end of said sensor manifold and a second end;

a vacuum source;

a primary air flow manifold connected between said vacuum source and said second end of said connector;

at least a first sonic nozzle disposed in said primary air flow manifold between said vacuum source and said connector member, said first sonic nozzle having a first mass air flow rate therethrough under sonic air flow conditions;

at least a first valve disposed in said primary air flow manifold, said first valve having an open state permitting air to flow through said first sonic nozzle and a closed state preventing an air flow through said first sonic nozzle;

an electrical control connected to said first valve and to said mass air flow sensor, said electrical control having first logic means for actuating said fist valve to produce a step change in said mass air flow rate through said calibrated mass air flow manifold and said sensor manifold, from said first air flow rate to said second air flow rate, second logic means for energizing said mass air flow sensor to generate a sensor signal having a value corresponding to the mass air flow rate through said sensor manifold and memory means for recording a time required for said sensor signal to change from an initial value to a new stable new value in response to said step change in said mass air flow rate.

12. The test apparatus of claim 11 wherein said first mass air flow rate has a value between 180 and 240 kilograms per hour.

13. The test apparatus of claim 11 wherein said mass air flow rate is approximately 210 kilograms per hour.

14. The test apparatus of claim 11 wherein said electrical control further comprises:

means for generating a response time signal having a value corresponding to said time required for said sensor signal to change from said initial value to said stable new value in response to said step change of said mass air flow rate; and comparator means for comparing said value of said response time signal to a reference value to generate a fail signal when the value of said response time signal is greater than said reference value.

15. The test apparatus of claim 14 wherein said primary air flow manifold further comprises:

a branch manifold connected between said second end of said connector member and said vacuum source;

a second sonic nozzle disposed in said branch manifold having a second mass air flow rate therethrough under sonic air flow conditions, said second mass air flow rate being substantially less than said first mass air flow rate;

a second valve disposed in said branch manifold, said second valve having an open state permitting air to flow through said second sonic nozzle and a closed state preventing air from flowing through said second sonic nozzle; and wherein said electrical control includes sequencing logic means for energizing said second valve initially providing said second mass air flow rate through said primary air flow manifold and said sensor manifold then energizing said first valve to increase the air flow rate through said primary air flow manifold and said sensor manifold, and where a step change in said sensor manifold is a step change from said second mass air flow rate to the combined first and second mass air flow rates.

16. The test apparatus of claim 11 further comprising:
a first pressure sensor for generating a first pressure signal having a value corresponding to the pressure of the air in said primary air flow manifold between said first sonic nozzle and said connector member; and a temperature sensor for generating a temperature signal having a value corresponding to the temperature of the air in said primary air flow manifold; and wherein said electrical control has means responsive to the values of said first pressure signal and said temperature signal to accurately determine the mass air flow rate in said primary air flow manifold.

17. The test apparatus of claim 16 further comprising a second pressure sensor connected to said vacuum source for generating a second pressure signal having a value corresponding to the pressure of said vacuum source.

18. A response time test apparatus for a mass air flow sensor mounted on a sensor manifold, said sensor manifold having an air input end and an air output end, said test apparatus comprising:
an air flow manifold having one end connectable to a vacuum source and an opposite end;
means for connecting said opposite end of said air flow manifold to said air output end of said sensor manifold;
a first sonic nozzle disposed in said air flow manifold for controlling the mass air flow through sensor manifold to have a first determinable value;
a first valve connected to said air flow for controlling the air flow through said air flow manifold; and
an electronic control for providing electrical power energizing said mass air flow sensor to generate an output signal having a value corresponding to the mass air flow rate through said sensor manifold, means for activating said first valve to an open state permitting an air flow through said sonic nozzle, said air flow causing a determinable step change in the mass air flow sensor through said sensor manifold, means responsive to activating said first valve to determine the response time of said output signal of said mass air flow sensor to said determinable step change in said mass air flow rate in said sensor manifold and comparator means for comparing the response time of said mass air flow sensor with a reference response time to generate a fail signal when the response time of said mass air sensor is greater than said reference response time.

19. The test apparatus of claim 18 wherein said air flow manifold further comprises:
a branch manifold connected in parallel with said first sonic nozzle and said first valve;
a second sonic nozzle disposed in said branch manifold for controlling the mass air flow through said branch manifold to have a second determinable value substantially less than said first determinable value;
a second value connected to said branch manifold for controlling the air flow through said second sonic nozzle; and
wherein said electrical control includes logic means for activating said first and second valves in a predetermined sequential to produce said step change in the mass air flow rate through said sensor manifold having a value corresponding to the difference between said first determinable mass air flow rate and said second determinable mass air flow rate.

* * * * *